United States Patent [19]
Ohki et al.

[11] Patent Number: 5,694,420
[45] Date of Patent: Dec. 2, 1997

[54] WIRELESS MODEM WITH LOW POWER CONSUMPTION AND HIGH RELIABILITY IN RECEPTION

[75] Inventors: Masahiro Ohki; Hideho Tomita, both of Tokyo, Japan

[73] Assignee: NEC Corporation, Tokyo, Japan

[21] Appl. No.: 625,976

[22] Filed: Apr. 1, 1996

[51] Int. Cl.$^6$ ............................... H04B 1/38; H04L 5/16
[52] U.S. Cl. ................. 375/222; 370/527; 455/343
[58] Field of Search .................. 375/222, 223, 375/219, 200, 202, 206, 340; 455/343; 370/522, 527, 528, 529, 505, 506

[56] References Cited

U.S. PATENT DOCUMENTS 5,241,568  8/1993  Fernandez et al. ............... 455/343
5,412,688  5/1995  Marbot ........................... 375/220

*Primary Examiner*—Stephen Chin
*Assistant Examiner*—Hai H. Phan
*Attorney, Agent, or Firm*—Foley & Lardner

[57] ABSTRACT

The object of the present invention is to provide a wireless modem that performs detection with high reliability even in the case of carrier detection by analogue level, and whereby a large decrease in power consumption in standby mode can be obtained. Control unit 80 controls synthesizer 100 during transmission mode so that it transmits from antenna 200 one or two or more unmodulated carriers that have not been subjected to spectrum dispersion, at the head of the transmission preamble signal; in addition it performs on/off control of the output transmission clock pulse and reception clock pulse of clock pulse generating control unit 90, and changeover control of transmission/reception switch 53. Control unit 80 outputs a carrier detection enable signal to level comparator 75. Controlling its operation. In standby mode, control unit 80 controls synthesizer 100 and IF unit 40 such that the received unmodulated carrier can be detected by level detector 60 and level comparator 75.

5 Claims, 6 Drawing Sheets

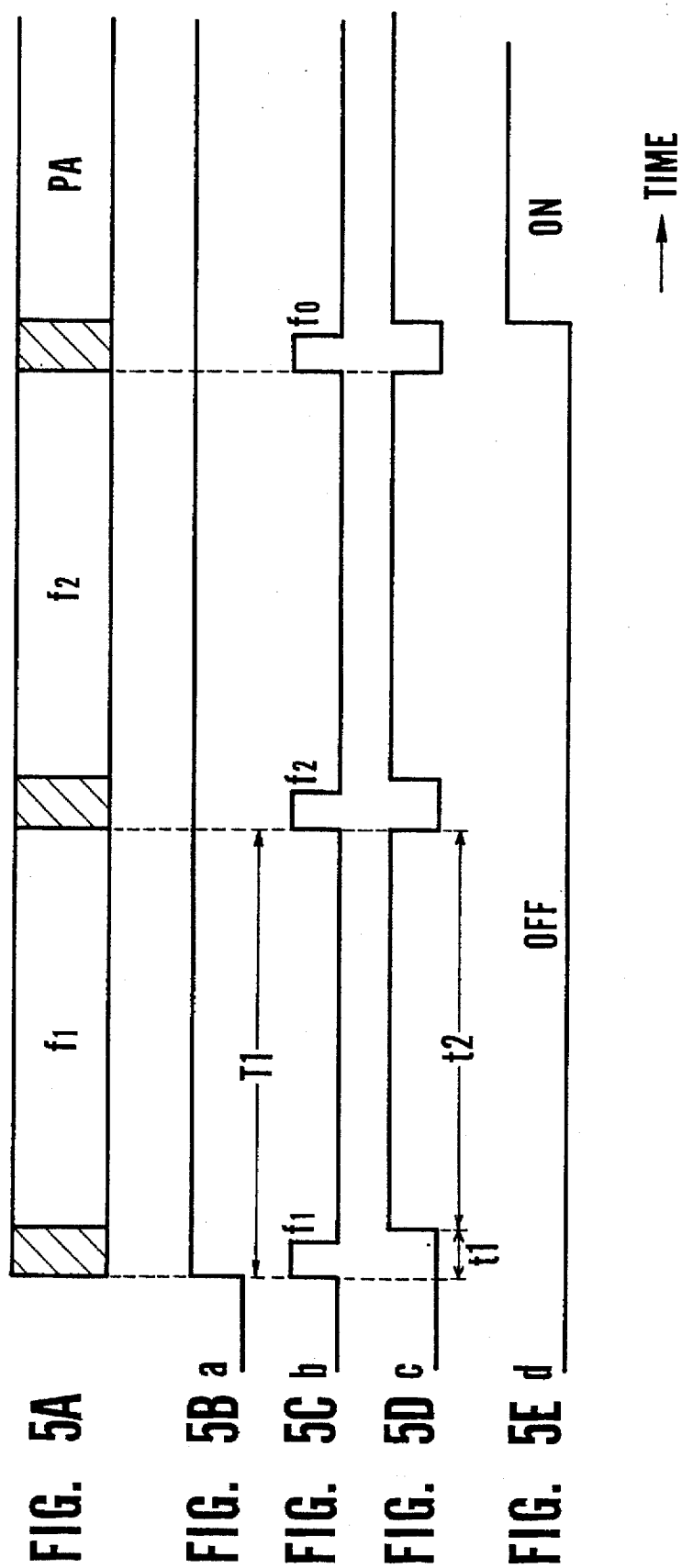

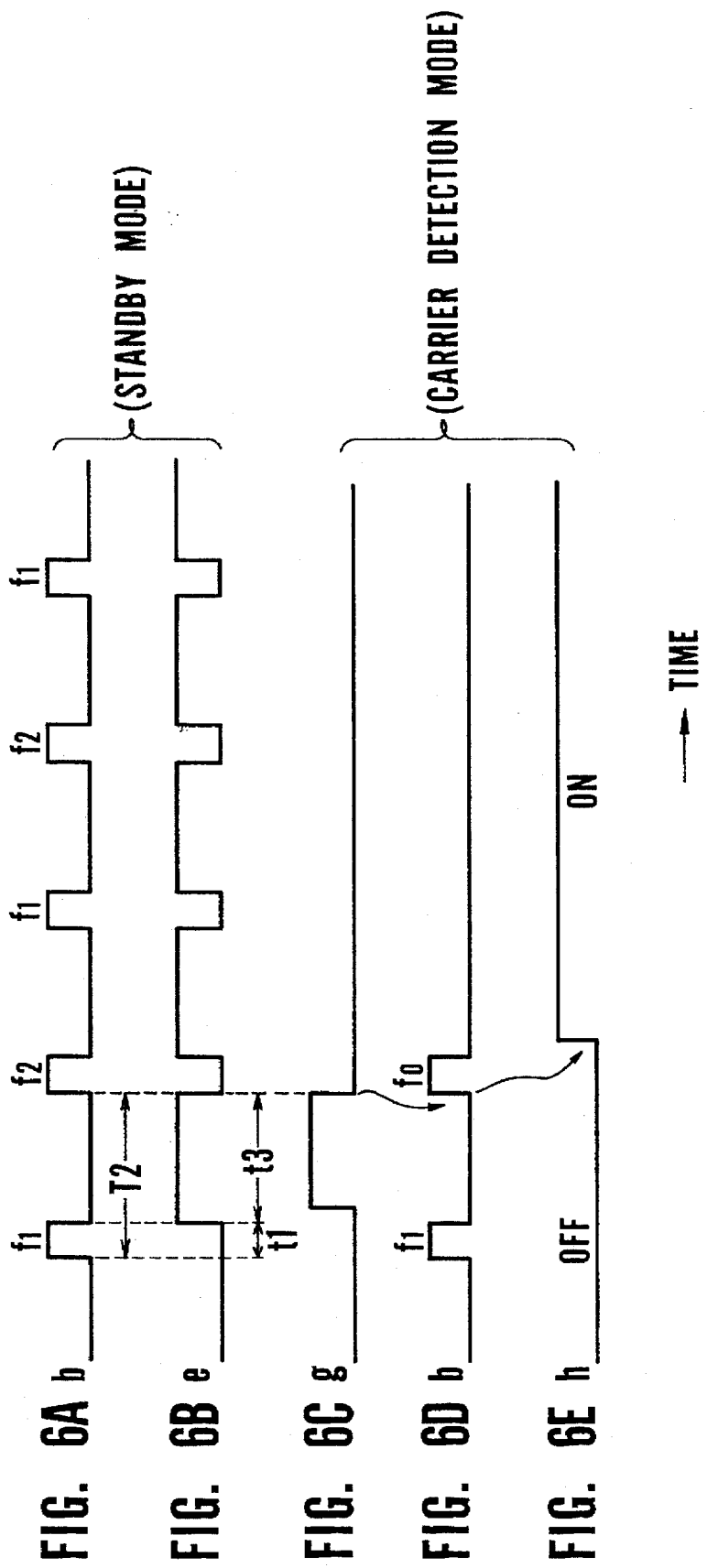

WIRELESS MODEM WITH LOW POWER CONSUMPTION AND HIGH RELIABILITY IN RECEPTION

BACKGROUND OF THE INVENTION

1. Field of the Invention

The present invention relates to wireless modems, and more particularly to wireless modems using the spread spectrum system that are used in radio communication within buildings, such as radio local area networks (LAN).

2. Description of the Prior Art

The spread spectrum system has advantages such as the ability to reduce the effect of interference to a low level, the ability for a large number of users to communicate in the same frequency band simultaneously without interference, and that it is resistant to eavesdropping, since the spectral density of the signal is extremely low. It will in the future therefore be widely employed for indoor radio communication systems such as radio LAN systems or communication systems based on very low intensity radio waves.

As is well known, spread spectrum systems may be roughly classified into direct sequence (DS) systems and frequency hopping (FH) systems. The DS system is a system in which the input signal is digitally converted and then multiplied with a dispersion code such as a PN (Pseudo Noise) series to obtain a spread spectrum (SS) wave which is then output. The FH system is a system wherein, after digitally converting the input signal, it is subjected to frequency conversion at a frequency that is made to hop with a prescribed pattern with time over a wide frequency range.

In radio LANs which are obligated to employ one or the other of this DS system or FH system, the DS system is most commonly used, on account of its excellent performance with respect to transmission rate and resistance to interference etc. When this is employed with a portable terminal or notebook personal computer operated with a battery, it is a requirement that stand-by current consumption be reduced to a low level.

FIG. 1 is a block diagram showing an example of a prior art wireless modem for putting this into practice. As shown in this FIG. 1, this prior art wireless modem comprises transmitting digital unit 10, receiving digital unit 20, orthogonal modulator/demodulator 30, IF unit 40, RF unit 50, level detector 60, level comparator 70, clock pulse generating control unit 90 and antenna 200.

Transmitting digital unit 10 is constituted by modulator 11, dispersion encoder 12, and multiplier 13. Receiving digital unit 20 is constituted of A/D converter 21, correlator 22 and demodulator 23. IF unit 40 is constituted of mixers 41 and 42 and voltage-controlled oscillator (VCO) 43. RF unit 50 comprises transmitting amplifier 51, receiving amplifier 52 and transmission/reception switch 53. Level comparator 70 comprises comparator 71 and reference voltage source 72.

Next, the operation of this prior art wireless modem will be described. When transmitting, first of all, the output signal of modulator 11 is fed to multiplier 13, which multiplies it with a dispersion code (in the FIG. 1, a PN series) that is input from dispersion encoder 12, thereby effecting spectrum spreading. The modulated wave that has been subjected to this spectrum-spreading process of the DS system is orthogonally modulated by orthogonal modulator/ demodulator 30 and then supplied to mixer 41 where it is frequency-converted with the output signal of VCO 43. It is then subjected to power amplification by transmitting amplifier 51 and transmitted from antenna 200 through transmission/reception switch 53.

Next, during reception, the RF signal received by antenna 200 is subjected to power amplification by receiving amplifier 52 and supplied to mixer 42 and subjected to frequency conversion with the signal from VCO 43 to produce an intermediate frequency signal (IF signal). This IF signal is subjected to orthogonal demodulation by orthogonal modulator/demodulator 30 and is then converted to a digital signal by A/D converter 21. The dispersion process is then reversed by correlator 22 and the result is demodulated by demodulator 23, thereby achieving demodulation to the original information.

In order to cut current consumption in stand-by mode, at times other than transmission or reception, generation of the clock pulse to transmitting digital unit 10 and receiving digital unit 20 from clock pulse generation control unit 90 is disabled. Output signal IF of mixer 42 has its reception level monitored by being supplied to level detector 60. It is further supplied to comparator 71, where level comparison is performed, using as threshold value the reference voltage from reference voltage source 72. If the threshold value is exceeded, the clock pulse of transmitting digital unit 10 and receiving digital unit 20 is applied by digital unit clock pulse generating control unit 90 and the initial period synchronisation mode is entered.

However, the prior art wireless modem using a DS system as described above was subject to the problem that, since carrier detection is performed by means of level comparator 70 in response to the analogue level before reverse dispersion (because the transmission spectrum has been subjected to dispersion), this analogue level is lower than the analogue level in a narrow-band system by the amount of the dispersion gain and stable carrier detection was therefore more difficult. It may be noted that such instability of the carrier detection can be avoided by performing carrier detection on the signal whose correlation has been detected by the correlator 22, but, with this method, it is not possible to disable the clock pulse to A/D converter 21 and correlator 22. This represents a large proportion of the overall current consumption during stand-by, so the benefit of cutting current consumption cannot be expected to be achieved.

SUMMARY OF THE INVENTION

With the foregoing in view, it is an object of the present invention to provide a wireless modem that can achieve detection with high reliability even in the case of carrier detection by means of an analogue level.

A further object of the present invention is to provide a wireless modem wherein power consumption can be greatly reduced during stand-by.

In order to achieve the aforesaid objects, according to the present invention there are provided:

a transmission digital unit that effects output with spectral dispersion based on a transmission clock pulse of a preamble signal for establishing initial synchronisation and data that are sequentially input;

transmission output means that converts the output signal of the transmission digital unit into a transmission frequency band before transmitting it;

appending means that superimposes one or two or more unmodulated carriers that have not been subjected to spectral dispersion at the head of the preamble signal in the signal that is transmitted by the transmission output means;

reception input means that obtains a reception signal by converting the signal received by an antenna to a prescribed frequency band; a reception digital unit that, based on a reception clock pulse, demodulates the received signal to the information signal by subjecting it to reverse dispersion processing; detection means that detects reception of the unmodulated carrier by detecting the received signal level;

clock pulse generating means that generates, respectively independently, the transmission clock pulse and reception clock pulse; and control means that exercises control such that the reception input means receives the unmodulated carrier at least until reception of the unmodulated carrier is detected by the detection means and that exercises control such that the reception input means receives the spectrum-dispersed signal after detection of the unmodulated carrier reception.

Furthermore it is desirable from the point of view of cutting power consumption that the control means according to the present invention controls the clock pulse generating means such that the output receiving clock pulse of the clock pulse generating means is turned off until reception of the unmodulated carrier is detected by the detection means, the reception clock pulse is turned on after detection of reception of the unmodulated carrier, and the transmission of clock pulse is turned off for the period for which the unmodulated carrier is output from the appending means.

The detection means according to the present invention may comprise a level detector that detects the level of the received signal from the reception input means and a level comparator that detects whether or not the unmodulated carrier has been received by comparing the output level detection signal of the level detector with a prescribed threshold value.

It is further desirable from the point of view of reducing spurious signals that the transmission output means and the reception input means are respectively provided with a common transmission/reception switch; when a plurality of the unmodulated carriers are transmitted, the transmission/reception switch is connected for a first fixed time to the transmission side and, after a first unmodulated carrier has been transmitted, is temporarily connected for a second fixed time shorter than the first fixed time to the receiving side; and is then connected once more for the first fixed time to the transmission side and the next unmodulated carrier is transmitted.

It is further desirable from the point of view of raising reliability and not producing interference with other systems that the plurality of unmodulated carriers are sequentially transmitted matching the sequence of the frequency hopping, and the first fixed time is set to be less than the dwell time of the frequency hopping.

Since, in the present invention, one or two or more unmodulated carriers that have not been subjected to spectrum dispersion are transmitted at the head of the preamble signal in the transmitted signal, in standby mode this unmodulated carrier is detected from the received signal, so more stable carrier detection can be achieved than with the conventional device in which a received signal that has been subjected to spectrum dispersion is detected in standby mode.

BRIEF DESCRIPTION OF THE DRAWINGS

FIGS. 5A to 5E are time charts given in explanation of the operation of the embodiment shown in FIG. 2; and FIGS. 6A to 6E are time charts given in explanation of the operation of the embodiment shown in FIG. 2.

DESCRIPTION OF THE PREFERRED EMBODIMENTS

Figure 1:
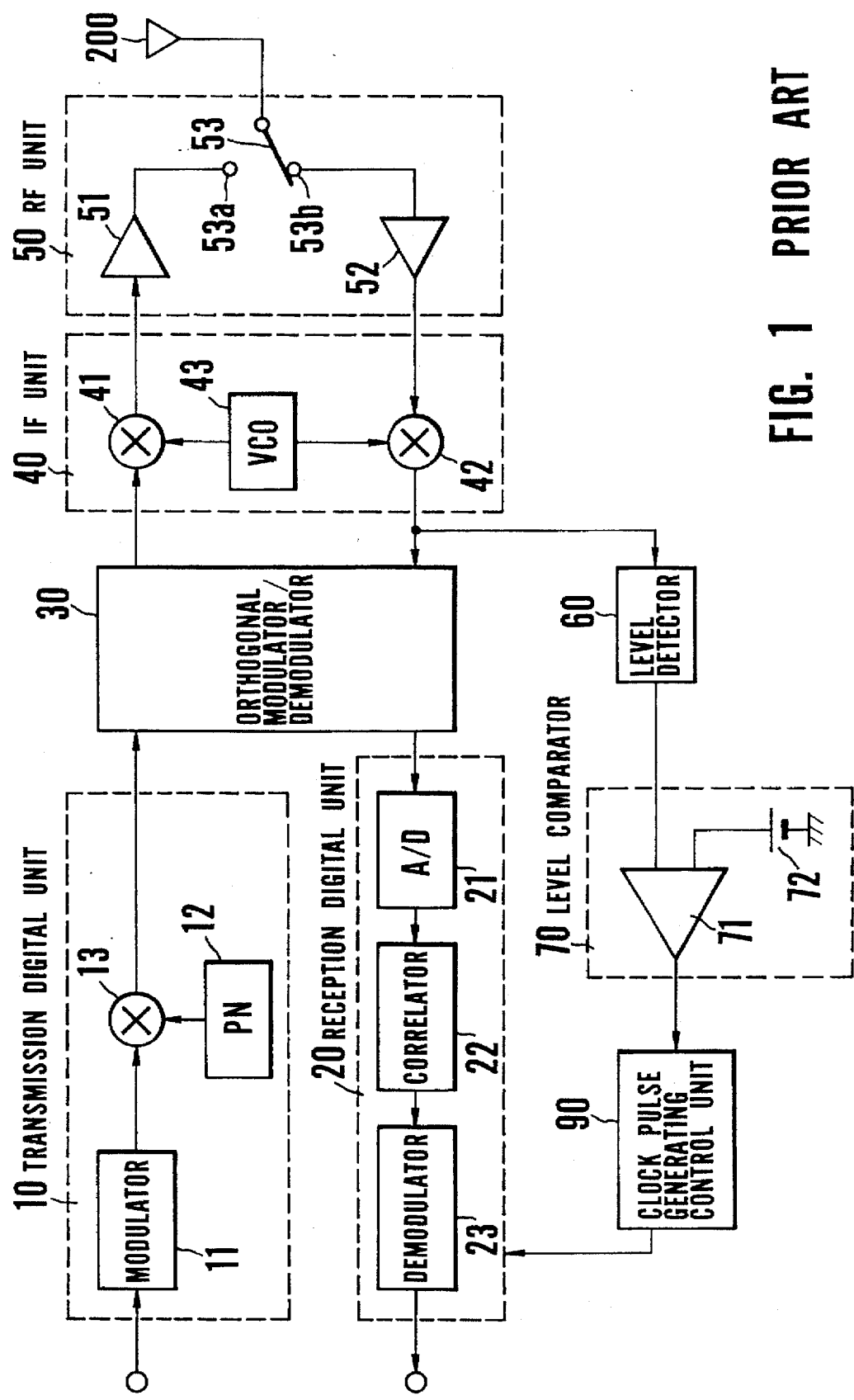
FIG. 1 is a block line diagram showing an example of a prior art wireless modem.
Figure 2:
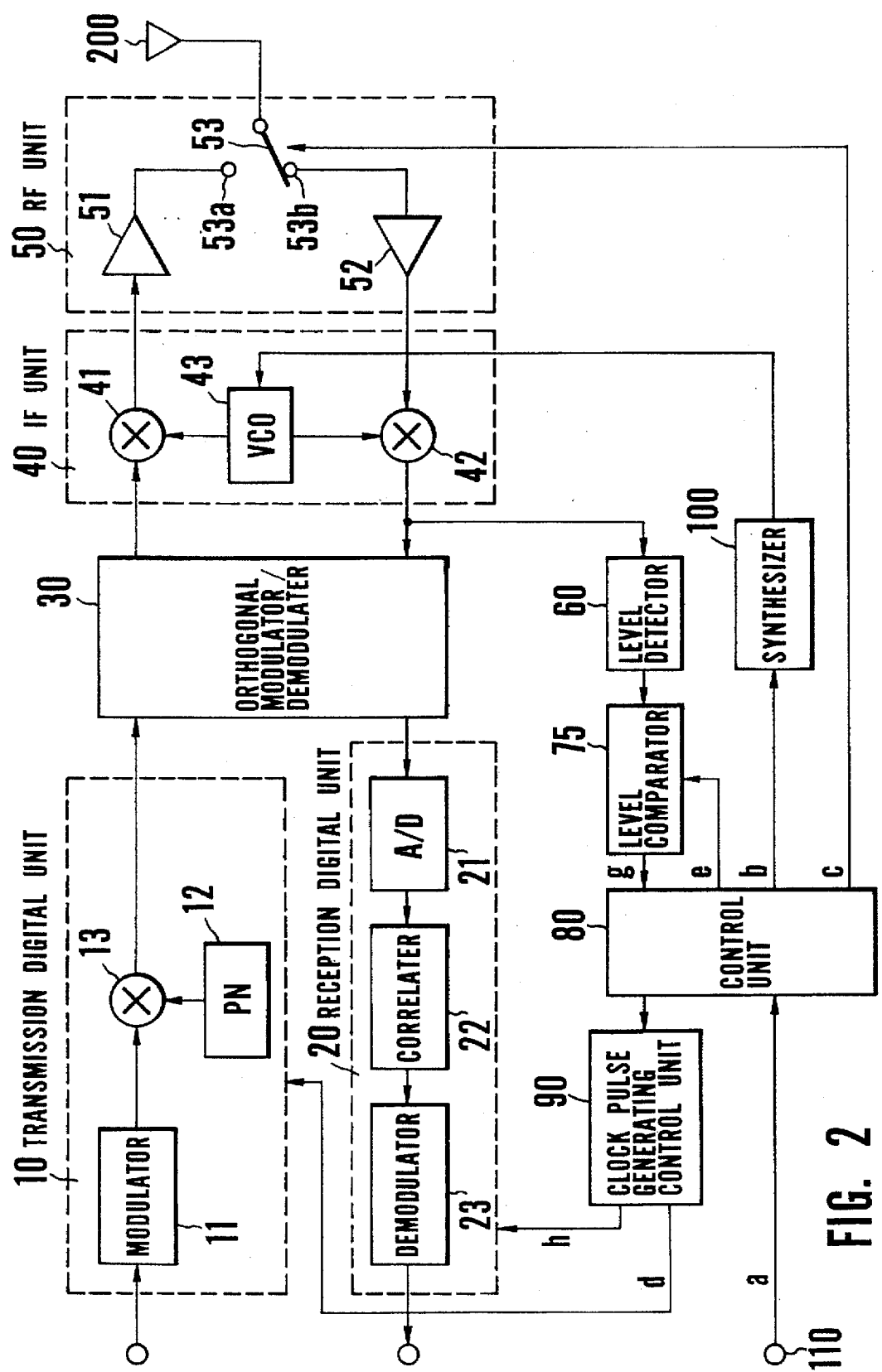
FIG. 2 is a block line diagram of an embodiment of a wireless modem according to the present invention.

Next, an embodiment of the present invention will be described. FIG. 2 shows a layout diagram of an embodiment of a wireless modem according to the present invention. In this Figure, parts which have the same construction as in FIG. 1 are given the same reference numerals and further explanation is omitted. As shown in FIG. 2, in order to solve the instability of carrier detection referred to above, the prior art device is further provided with control unit 80 and synthesizer 100, and an unmodulated carrier is appended in front of the preamble signal for initial synchronisation on transmission; in stand-by, reception of the preamble signal is commenced by supplying the receiving clock pulse after detection of this unmodulated carrier.

On transmission, control unit 80 sets the frequency of the unmodulated carrier in synthesizer 100 and generates this from IF unit 40. Control unit 80 also performs on/off control of the transmission clock and reception clock that are output from clock pulse generating control unit 90, and changeover control of transmission/reception switch 53. Also, control unit 80 outputs a carrier detection enabling signal e to level comparator 75, thereby controlling its operation. It should be noted that level comparator 75 incorporates a switch that is on/off controlled in response to this carrier detection enable signal e, on the output signal of comparator 71 of level comparator 70 of the prior art example shown in FIG. 1.

Figure 3:
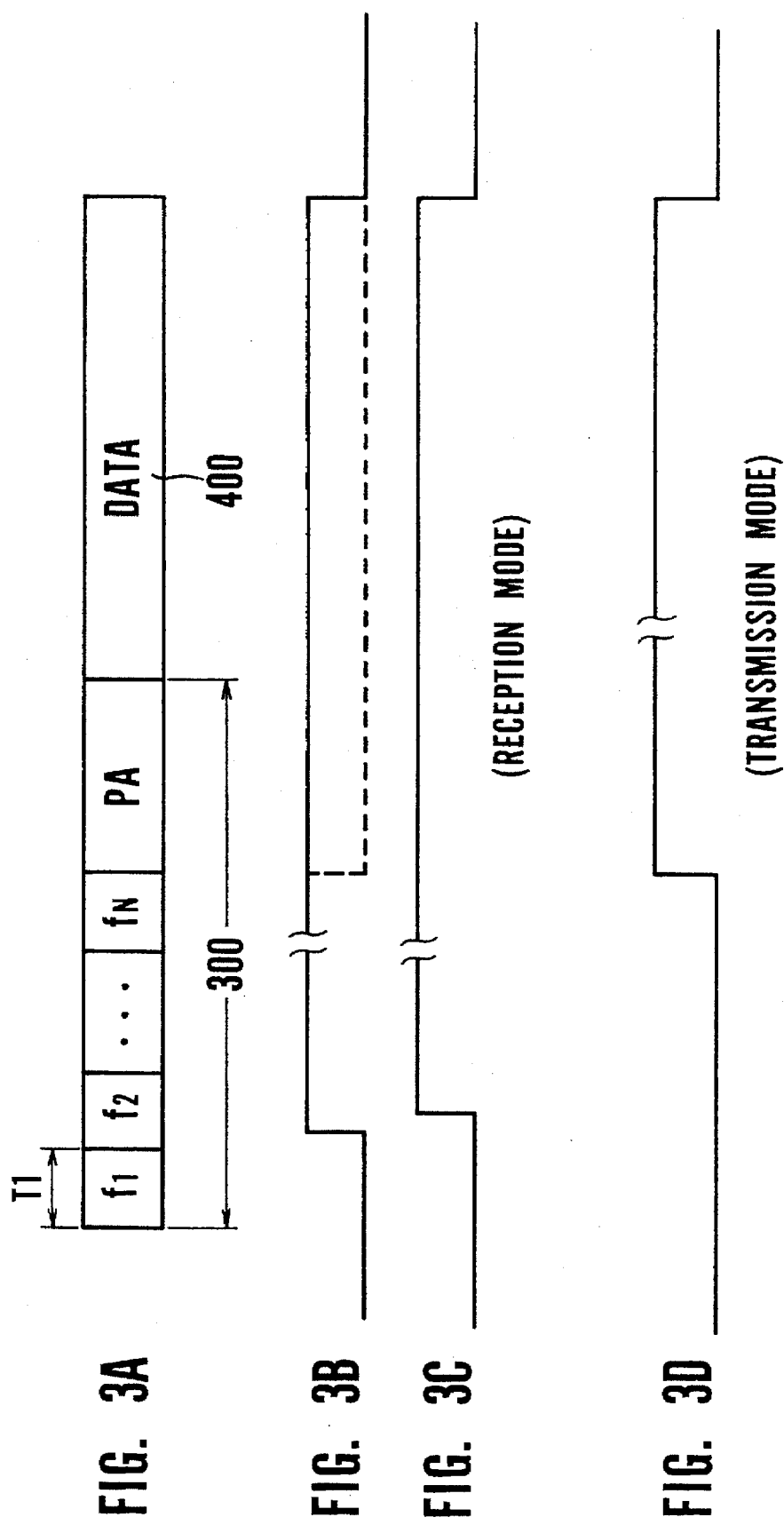
FIGS. 3A to 3D illustrate the signal in each unit of the embodiment shown in FIG. 2.

In this embodiment, as shown in FIG. 3A the data that is exchanged has a structure wherein a physical-layer header 300 of a structure wherein unmodulated carriers $f_1$ to $f_N$ are successively superimposed with fixed period T1 that is added at the head of the data region 400, in advance of the preamble signal PA. When this data is received, the receiving clock pulse and transmitting clock pulse shown in FIGS. 3C and 3D are respectively off and the carrier detection signal obtained by detecting the unmodulated carrier by level detector 75 as shown in FIG. 3B is output. Only when, as shown in FIG. 3C, the received clock pulse is turned on is reception of preamble signal PA commenced.

Also, as shown in FIGS. 3A and 3D, on reception, immediately after transmission of the N-th unmodulated carrier $f_N$ has been completed, the transmission clock pulse is turned on; in response to this, operation of transmission digital unit 10 is commenced and, as in the case of the prior art, spread-spectrum modulation is performed on the preamble signal PA and the data.

Figure 4:
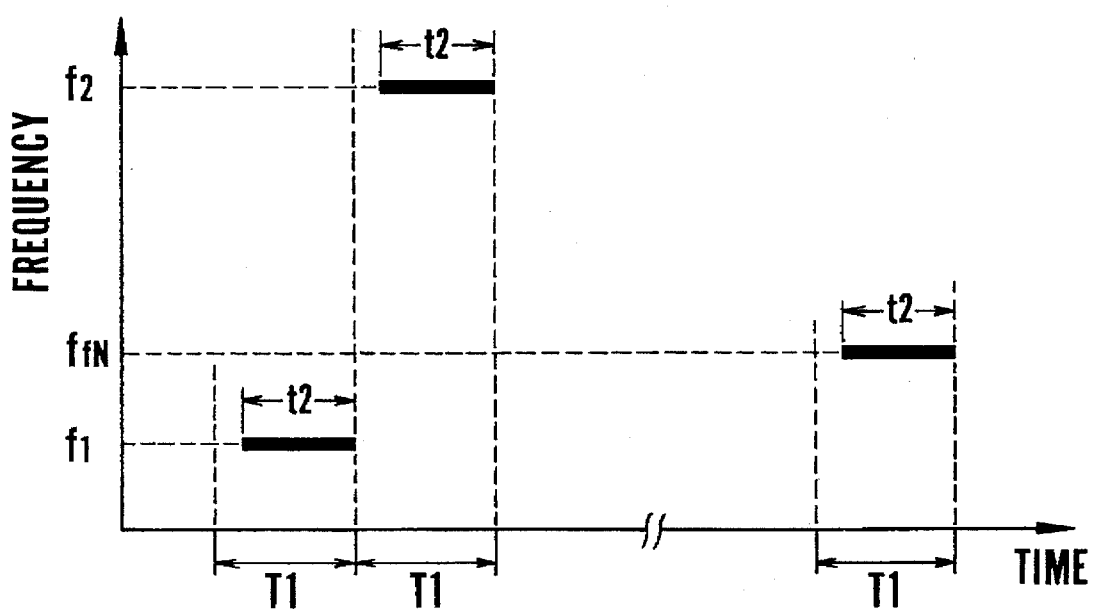
FIG. 4 shows the transmission pattern of the demodulated carrier in an embodiment of the present invention.

It is sufficient to use only a single unmodulated carrier wave. However, in an environment in which frequency-selective fading occurs, as shown in FIG. 3A, two or more carrier waves may be employed, to improve the reliability of detection of the unmodulated carrier. In this case, unmodulated carriers $f_1$–$f_N$ are transmitted by the FH system in order that the transmission of the unmodulated carriers $f_1$–$f_N$ should not cause any interference to other systems. Specifically, unmodulated carriers $f_1$–$f_N$ constitute the hopping channel centre frequency; as shown in FIG. 4, their transmission sequence matches the hopping sequence; also, their transmission time t2 is restricted to be less than the dwell time t1 which is the changeover period of FH.

This is because, in the DS system, unlike the FH system, during stand-by, the transmission side and the receiving side are not synchronised to the hopping period, so the receiving side performs carrier detection on all of the frequencies of the N unmodulated carriers $f_1$–$f_N$. Regarding the synthesizer 100 to be used in this case, a high-speed synthesizer is unnecessary and a synthesizer as employed for ordinary DS-type spread-spectrum modulation is sufficient; this is because, with the FH system in a radio LAN, the system is a slow FH system with a long dwell time, the number N of unmodulated carriers that are employed does not need to be more than a small number in the range up to 10 at the most in practice, and only the time needed for carrier detection and stabilisation of the synthesizer is needed (in contrast to the case of data transmission).

Next, the operation of the embodiment shown in FIG. 2 and constructed as described above will be described with the aid of the time charts of FIGS. 5A to 5E and FIGS. 6A to 6E. For convenience, the number of unmodulated carriers is taken as "2".

First of all, the operation during transmission will be described with reference to the time charts of FIGS. 5A to 5E. When transmission request signal a shown in FIG. 5B is input to control unit 80 through terminal 110 from the upper layer, control unit 80 outputs a frequency-setting signal b as shown in FIG. 5C to synthesizer 100 and synthesizer 100 outputs a signal for generating first unmodulated carrier frequency $f_1$ and supplies changeover signal c shown in FIG. 5D to transmission/reception switch 53 within RF unit 50, causing transmission/reception switch 53 connected to terminal 53b to be changed over to connect to terminal 53a after the lapse of a time t1. This time t1 is set to be larger than the frequency stabilisation time of synthesizer 100.

Also, even though transmission request signal a is input, control unit 80 still controls clock pulse generating control unit 90 so that not only the received clock pulse but also the transmission clock pulse stay in off condition as shown at d in FIG. 5E. Consequently, under these conditions, transmission digital unit 10 is not actuated and no modulated signal is input to mixer 41 from orthogonal modulator 30.

However, the signal that is output from synthesizer 100 is applied as control voltage to VCO 43 within IF unit 40, causing this to oscillate, outputting a signal of frequency $f_1$. Consequently, the signal of frequency $f_1$ that is output from VCO 43 is then transmitted as first unmodulated carrier from antenna 200 through mixer 41, transmitting amplifier 51, and transmission/reception switch 53. The signal of this first unmodulated carrier frequency $f_1$ is transmitted until the lapse of a time T1 from input of the transmission request signal a to control unit 80, in other words up to the lapse of a time t2 (=T1–t1) after the changeover of transmission/ reception switch 53 from terminal 53b to terminal 53a. Time t2 is made to be within the aforesaid dwell time.

Next, control unit 80 is changed over to output a signal causing the generation of second unmodulated carrier frequency $f_2$ from synthesizer 100, by outputting to synthesizer 100 frequency setting signal b shown in FIG. 5C, and supplies the changeover signal c shown in FIG. 5D to transmission/reception switch 53 within RF unit 50, causing transmission/reception switch 53 that is connected to terminal 53a to be changed over to be connected to terminal 53b, thereby avoiding transmission of spurious signals at changeover time t1.

Next, control unit 80, after the lapse of the time t1 of the aforesaid changeover, supplies a changeover signal c shown in FIG. 5D once more to transmission/reception switch 53 in RF unit 50, causing the transmission/reception switch 53 that was connected to terminal 53b to be changed over to be connected to terminal 53a. By this means, in the same way as described above, a signal of frequency $f_2$ that is output from VCO 43 is transmitted during the period t2, as second unmodulated carrier, from antenna 200, through mixer 41, transmitting amplifier 51, and transmission/reception switch 53, respectively.

Next, after the aforesaid period t2, control unit 80 causes the device to shift to the transmission mode of the basic DS system. Specifically, control unit 80 outputs to synthesizer 100 a frequency setting signal b shown in FIG. 5C, thereby effecting a changeover to produce output of a signal for generating a carrier frequency $f_0$ of the DS system from synthesizer 100, and changing over the connection of transmission/reception switch 53 to terminal 53b during the period t1, by means of changeover signal c shown in FIG. 5D, so that spurious signals are not transmitted at changeover time t1. Transmission/reception switch 53 is then again changed over to terminal 53a, and transmission clock pulse d is turned on as shown in FIG. 5E, thereby putting transmission digital unit 10 into actuated condition.

By this means, preamble signal PA and the data are then in turn subjected to spectrum dispersion, followed by frequency conversion at carrier frequency $f_0$ in IF unit 40, before being transmitted from antenna 200 through transmission amplifier 51 and transmitting/receiving switch 53.

Next, the operation during stand-by mode will be described with reference to the time charts of FIGS. 6A to 6E in combination. In stand-by mode, transmitting/receiving changeover unit 53 is connected to terminal 53b by control unit 80, and synthesizer 100 is set alternately with period T2 to frequencies f1 and f2. In the FH system, synchronisation of all the terminals in the service area is obtained and the frequency of each terminal is then changed over synchronously with the hopping period. However, since this embodiment employs a DS system, it is desirable that it should be possible to detect the unmodulated carrier even though synchronisation of all terminals has not been obtained.

To this end, the period T2 referred to above is made shorter than the unmodulated carrier transmission continuation time t2. That is, it is arranged that carrier detection can be achieved with frequencies f1 and f2 within the aforementioned time t2 for which the unmodulated carrier continues to be transmitted, since synchronisation between the transmitting terminal and receiving terminal is not obtained during the stand-by period.

It should be noted that the same applies even where the number of unmodulated carrier waves is more than 3: the frequency of synthesizer 100 is set such that carrier detection can be achieved at all frequencies within the aforementioned time t2. However, there is a trade-off between the extent to which the number of unmodulated carriers can be increased and the frequency stabilisation time of synthesizer 100 and the carrier detection time and dwell time of level detector 60.

The signal received by antenna 200 is input to orthogonal modulator/demodulator 30 through transmission/reception switch 53, reception amplifier 52 and mixer 42; it is also input to level detector 60. In this connection, the signal frequency for frequency conversion that is input from VCO 43 to mixer 42 is chosen as a frequency alternately equal to unmodulated carrier frequency $f_1$, $f_2$ in each period T2, in response to the output signal from synthesizer 100, as described above; furthermore, a low-pass filter is provided in the initial input stage of level detector 60 to filter out DC signals, so the level detected by level detector 60 is a high level exceeding the threshold value of level comparator 75 when an unmodulated carrier is received of the same frequency as the frequency of the signal for frequency conversion.

The output level detection signal of level detector 60 is supplied to level detector 75. In control unit 80, as shown in FIG. 6B, signal e that becomes high level during the time t3 after the lapse of a time t1 after setting synthesizer 100 to unmodulated carrier frequency $f_1$ or $f_2$ is used as the carrier detection enabling signal; this is supplied to the aforementioned level detector 75, which it controls by putting it into a substantially actuated condition (specifically, it turns on a switch provided on the output side of the comparator 71 shown in FIG. 1 and outputs the output signal of comparator 71 to control unit 80).

Consequently, when for example an unmodulated carrier $f_1$ is received when frequency $f_1$ is output from VCO 43, as shown in FIG. 6C, in the period of the actuated condition t3, level comparator 75 supplies control unit 80 a carrier detection system g that indicates that the detection level is higher than the threshold value.

When this happens, control unit 80, as shown in FIG. 6D, sets the next frequency that is set in synthesizer 100 by means of frequency setting signal b to the basic carrier frequency of the DS system, and then, as shown in FIG. 6E, changes over the receiving clock pulse h that is output from clock pulse generating control unit 90 after frequency stabilisation of synthesizer 100 from its previous off condition to the on condition.

The device thereby shifts to the preamble signal receiving mode and the received signal that is input through orthogonal modulator/demodulator 30 is converted to a digital signal by A/D converter 21; it is then subjected to reverse dispersion by correlator 22, and demodulated by demodulator 23 to obtain the original information.

Thus, since, in this embodiment, unmodulated carriers $f_1$ and $f_2$ that have not been subjected to spectrum dispersion are transmitted, and these are detected during stand-by mode, more stable carrier detection can be achieved than is the case where the signals that are detected have been subjected to spectrum dispersion.

Also, in this embodiment, if the level of frequency $f_1$ is decreased due to frequency-selective fading, the possibility is produced that unmodulated carrier $f_1$ may not be detected. However, in this embodiment, since in this case carrier frequency $f_2$ can be detected, the reliability of carrier detection can be increased.

Furthermore, in this embodiment, since, in stand-by mode, digital receiving unit 20 is put in operation-disabled condition by arranging for only the circuitry for carrier detection to be in actuated condition, the power consumption during stand-by mode can be Greatly reduced without top-layer power management support. This embodiment is therefore ideal in particular for application to portable terminals or notebook personal computers that are operated by batteries.

As described above, with the present invention, one or two or more unmodulated carriers that have not been subjected to spectrum dispersion are transmitted in superimposed manner at the head of the preamble signal in the transmitted signal, and, in stand-by mode, this unmodulated carrier is detected from the received signal. Greater reliability of transmission and reception can therefore be obtained than in the prior art device, since carrier detection can be achieved more stably than in the prior art device, in which the received signal is detected after it has been subjected to spectrum dispersion.

Also, with this embodiment, until reception of the unmodulated carrier is detected, the output reception clock pulse of the clock pulse generating means is turned off, and the reception clock pulse is only turned on after detection of the reception of the unmodulated carrier; also, the clock pulse generating means is controlled so as to turn off the transmission clock pulse for the period for which the unmodulated carrier is output. In stand-by mode, therefore, only the circuitry for carrier detection is active and both the transmission digital unit and receiving digital unit are deactuated. Power consumption during stand-by can therefore be greatly reduced without top-layer power management support.

What is claimed is:

1. A wireless modem, comprising:
   a transmission digital unit for effecting an output with spectral dispersion based on a transmission clock pulse of a preamble signal for establishing initial synchronisation and data that are sequentially input, said preamble signal having a header;
   transmission output means for converting the output of said transmission digital unit into a transmission frequency band output signal before transmitting the output signal;
   appending means for superimposing one or more unmodulated carriers that have not been subjected to spectral dispersion on the header of said preamble signal in the output signal that is transmitted by said transmission output means;
   reception input means for obtaining a reception signal by converting a received signal received by an antenna to a prescribed frequency band;
   a reception digital unit for demodulating said reception signal to an information signal based on a reception clock pulse by subjecting the reception signal to reverse dispersion processing;
   detection means for detecting reception of a received unmodulated carrier by detecting a level of the received signal;
   clock pulse generating means for generating, respectively independently, said transmission clock pulse and said reception clock pulse; and
   control means for exercising control such that said reception input means receives said received unmodulated carrier at least until reception of said received unmodulated carrier is detected by said detection means, said control means further exercising control such that said reception input means receives a spectrum-dispersed signal after detection of reception of said received unmodulated carrier.

2. A wireless modem according to claim 1, wherein said control means controls said clock pulse generating means such that the reception clock pulse of said clock pulse generating means is turned off until reception of said received unmodulated carrier is detected by said detection means, said reception clock pulse being turned on after detection of the reception of said received unmodulated carrier, and said transmission clock pulse is turned off for a period for which said one or more unmodulated carriers are output from said appending means.

3. A wireless modem according to claim 1, wherein said detection means comprises a level detector that detects a level of the reception signal from said reception input means and a level comparator that detects whether or not said received unmodulated carrier has been received by comparing an output level detection signal from said level detector with a prescribed threshold value.

4. A wireless modem according to claim 1, wherein said transmission output means and said reception input means are respectively provided with a common transmission/reception switch; when a plurality of said one or more unmodulated carriers are transmitted, said transmission/reception switch being connected for a first fixed time to a transmission side and, after a first unmodulated carrier has been transmitted, being temporarily connected for a second fixed time shorter than said first fixed time to a receiving side; and then being connected once more for said first fixed time to the transmission side and a next unmodulated carrier is transmitted.

5. A wireless modem according to claim 4, wherein said plurality of said one or more unmodulated carriers are sequentially transmitted matching a sequence of frequency hopping, and said first fixed time is set to be less than a dwell time of said frequency hopping.

* * * * *